United States Patent
Kinzinger

(10) Patent No.: US 11,593,277 B2
(45) Date of Patent: *Feb. 28, 2023

(54) METHOD OF SECURE MEMORY ADDRESSING

(71) Applicant: Kinzinger Automation GmbH, Rastatt (DE)

(72) Inventor: Klaus Kinzinger, Rastatt (DE)

(73) Assignee: Kinzinger Automation GmbH, Rastatt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,169

(22) Filed: Aug. 20, 2020

(65) Prior Publication Data

US 2020/0387459 A1    Dec. 10, 2020

Related U.S. Application Data

(63) Continuation of application No. 16/079,667, filed as application No. PCT/EP2017/054535 on Feb. 27, (Continued)

(51) Int. Cl.
*G06F 12/14* (2006.01)
*G06F 9/30* (2018.01)
(Continued)

(52) U.S. Cl.
CPC ........ *G06F 12/1441* (2013.01); *G06F 9/3013* (2013.01); *G06F 9/30101* (2013.01); (Continued)

(58) Field of Classification Search
CPC ............ G06F 9/30101; G06F 9/30123; G06F 9/3013; G06F 9/30134; G06F 9/30145; (Continued)

(56) References Cited

U.S. PATENT DOCUMENTS 4,525,780 A ‡ 6/1985 Bratt .............. G01R 31/318505
  711/16
4,575,795 A ‡ 3/1986 Boothroyd ................ G06F 7/48
  364/200
(Continued)

FOREIGN PATENT DOCUMENTS

EP    0676691 A2 ‡ 10/1995  ............... G06F 7/72
EP    0793179 A2 ‡  9/1997  ............... G06F 8/52
(Continued)

OTHER PUBLICATIONS

Wichtel et al.: "Mondrix: Memory Isolation for Linux Using Mondriaan Memory Protection", SOSP'05, Oct. 23-26, 2005, Brighton, United Kingdom., Oct. 23, 2005 (Oct. 23, 2005),-Oct. 26, 2005 (Oct. 26, 2005), pp. 31-44, XP040029779, ACM, 2 Penn Plaza, Suite701—New York USA.‡

(Continued)

*Primary Examiner* — Larry T MacKall
(74) *Attorney, Agent, or Firm* — Hansen IP Law PLLC

(57) ABSTRACT

The problem to be solved is to seek an alternative to known addressing methods which provides the same or similar effects or is more secure. Solution The problem is solved by a method (40) of addressing memory in a data-processing apparatus (10) comprising, when a central processing unit (11), while performing a task (31, 32, 33, 34) of the apparatus (10), executes an instruction involving a pointer (59) into a segment (s, r, d, h, f, o, i, c) of the memory: decoding the instruction by means of an instruction decoder (12), generating a virtual address (45) within the memory by means of a safe pointer operator (41) operating on the pointer (59), augmenting the virtual address (45) by an identifier (43) of the task (31, 32, 33, 34) and an identifier (44) of the segment (s, r, d, h, f, o, i, c), said identifiers (43, 44) being hardware-controlled (42), and, based on the aug- (Continued)

mented address (45), dereferencing the pointer (59) via a memory management unit (13).

16 Claims, 4 Drawing Sheets

Related U.S. Application Data 2017, now Pat. No. 10,789,178, which is a continuation of application No. PCT/EP2016/000345, filed on Feb. 27, 2016, and a continuation of application No. PCT/EP2016/000344, filed on Feb. 27, 2016.

(51) Int. Cl.
| | |
|---|---|
| *G06F 9/35* | (2018.01) |
| *G06F 9/46* | (2006.01) |
| *G06F 9/34* | (2018.01) |
| *G06F 21/60* | (2013.01) |
| *G06F 12/0875* | (2016.01) |
| *G06F 12/109* | (2016.01) |

(52) U.S. Cl.
CPC ...... *G06F 9/30123* (2013.01); *G06F 9/30134* (2013.01); *G06F 9/30145* (2013.01); *G06F 9/30192* (2013.01); *G06F 9/342* (2013.01); *G06F 9/35* (2013.01); *G06F 9/468* (2013.01); *G06F 12/0875* (2013.01); *G06F 12/109* (2013.01); *G06F 12/1491* (2013.01); *G06F 21/60* (2013.01); *G06F 12/14* (2013.01); *G06F 12/145* (2013.01); *G06F 2212/451* (2013.01); Y02D 10/00 (2018.01)

(58) Field of Classification Search
CPC ........ G06F 9/30192; G06F 9/342; G06F 9/35; G06F 9/468; G06F 12/0875; G06F 12/109; G06F 12/14; G06F 12/1441; G06F 12/145; G06F 12/1491; G06F 21/60; G06F 2212/51; Y02D 10/00
See application file for complete search history.

(56) References Cited

U.S. PATENT DOCUMENTS

| | | | | |
|---|---|---|---|---|
| 5,107,457 A ‡ | 4/1992 | Hayes | ..................... | G06F 9/06 395/800 |
| 5,280,614 A ‡ | 1/1994 | Munroe | ............... | G06F 12/1491 710/20 |
| 5,325,496 A ‡ | 6/1994 | Hays | ..................... | G06F 11/00 395/400 |
| 5,509,131 A ‡ | 4/1996 | Smith | ...................... | G06F 12/10 395/416 |
| 5,564,031 A | 10/1996 | Amerson | | |
| 5,644,709 A ‡ | 7/1997 | Austin | ................... | G06F 11/00 395/185.06 |
| 5,852,762 A | 12/1998 | Lin | | |
| 5,855,010 A ‡ | 12/1998 | Wavish | .................. | G06F 15/18 706/45 |
| 6,035,391 A | 3/2000 | Isaman | | |
| 6,446,034 B1 * | 9/2002 | Egolf | .................. | G06F 9/45554 703/27 |
| 6,574,721 B1 ‡ | 6/2003 | Christenson | ............ | G06F 12/06 711/209 |
| 6,886,085 B1 ‡ | 4/2005 | Shuf | ...................... | G06F 12/00 711/159 |
| 9,032,174 B2 ‡ | 5/2015 | Nishiguchi | ........... | G06F 3/0622 711/163 |
| 9,798,873 B2 ‡ | 10/2017 | Glew | ..................... | G06F 21/52 726/22 |
| 10,146,707 B2 ‡ | 12/2018 | Kawai | ................. | G06F 12/1475 |
| 2001/0044891 A1 ‡ | 11/2001 | McGrath | ............. | G06F 9/30189 712/22 |
| 2002/0144091 A1 | 10/2002 | Widigen | | |
| 2003/0037037 A1 ‡ | 2/2003 | Adams | ..................... | G06F 7/00 707/1 |
| 2003/0065929 A1 ‡ | 4/2003 | Milliken | .................. | H04L 9/00 713/189 |
| 2003/0154363 A1 | 8/2003 | Soltis, Jr. et al. | | |
| 2004/0003208 A1 ‡ | 1/2004 | Damron | ............. | G06F 9/30032 712/22 |
| 2004/0015876 A1 ‡ | 1/2004 | Applin | ...................... | G06F 9/44 717/127 |
| 2005/0102494 A1 | 5/2005 | Grochowski et al. | | |
| 2005/0108497 A1 ‡ | 5/2005 | Bridges | .................. | G06F 9/342 711/207 |
| 2005/0257051 A1 ‡ | 11/2005 | Richard | ..................... | H04L 9/00 713/165 |
| 2006/0020946 A1 ‡ | 1/2006 | Alexander | .......... | G06F 9/30043 719/31 |
| 2007/0106885 A1 | 5/2007 | Rychlik | | |
| 2008/0104325 A1 ‡ | 5/2008 | Narad | ..................... | G06F 12/08 711/122 |
| 2008/0177974 A1 * | 7/2008 | Chiang | ............... | G06F 12/1018 711/E12.002 |
| 2008/0222397 A1 ‡ | 9/2008 | Wilkerson | .......... | G06F 12/1483 712/22 |
| 2010/0161948 A1 ‡ | 6/2010 | Abdallah | .............. | G06F 9/3857 712/22 |
| 2014/0281398 A1 ‡ | 9/2014 | Rash | ...................... | G06F 9/455 712/208 |
| 2015/0293767 A1 ‡ | 10/2015 | Michishita | .............. | G06F 9/355 712/22 |
| 2018/0004678 A1 ‡ | 1/2018 | Bogusz | .............. | G06F 12/1027 |

FOREIGN PATENT DOCUMENTS

| | | | |
|---|---|---|---|
| EP | 1764682 A2 ‡ | 3/2007 | ............... G06F 9/34 |
| EP | 2211285 A1 ‡ | 7/2010 | |
| WO | WO-1981002477 A1 ‡ | 9/1981 | |
| WO | WO-2007048128 A2 ‡ | 4/2007 | ......... G06F 9/30123 |

OTHER PUBLICATIONS

International Search Report and Written Opinion for PCT/EP2017/054535 dated May 31, 2017.‡

Hand, Tom, "The Harris RTX 2000 Microcontroller", Journal of Forth Application and Research, (1990), vol. 6.1, pp. 5-13.‡

International Search Report and Written Opinion for PCT/EP2017/054532 dated May 18, 2017.‡

Juneja, B.L.. Programming with C++, New Age International, 2009. ProQuest Ebook Central, https://ebookcentral.proquest.com/lib/uspto-ebooks/detail.action?docID=437715. (Year: 2009).‡

Witchel, Emmett; Mondrix: Memory Isolation for Linux using Mondriaan Memory Protection, 2005, ACM Symposium on Operating System Principles, pp. 3-4. (Year: 2005).‡

\* cited by examiner
‡ imported from a related application

|  | task 1 | task 2 | task 3 | task 4 | ... |
|---|---|---|---|---|---|
| s → | mem s1 | mem s2 | mem s3 | mem s4 | ... |
| r → | mem r1 | mem r2 | mem r3 | mem r4 | ... |
| d → | mem d1 | mem d2 | mem d3 | mem d4 | ... |
| h → | mem h1 | mem h2 | mem h3 | mem h4 | ... |
| f → | mem f1 | mem f2 | mem f3 | mem f4 | ... |
| o → | mem o1 | mem o2 | mem o3 | mem o4 | ... |
| i → | mem i1 | mem i2 | mem i3 | mem i4 | ... |
| c → | mem c1 | mem c2 | mem c3 | mem c4 | ... |
FIG. 3
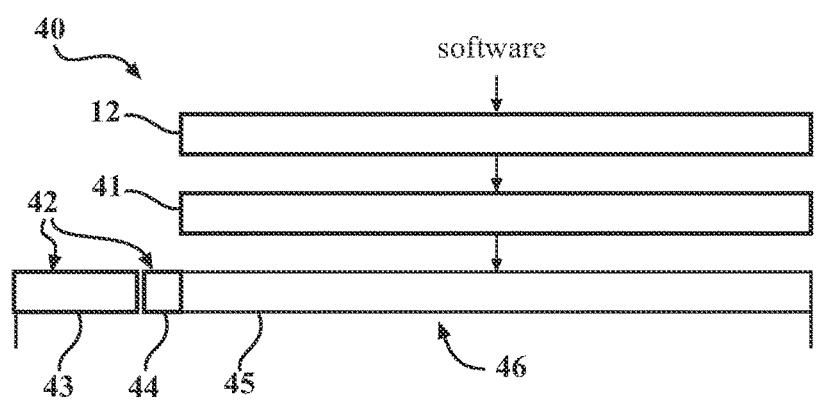
FIG. 4
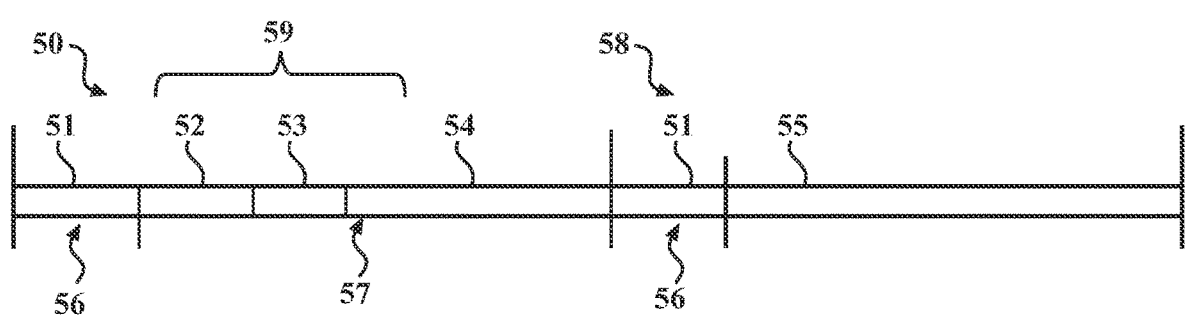
FIG. 5

METHOD OF SECURE MEMORY ADDRESSING

CROSS-REFERENCE TO RELATED APPLICATIONS

This application is a continuation of U.S. patent application Ser. No. 16/079,667, filed on Aug. 24, 2018, hereby incorporated by reference, which is a national stage entry of Patent Cooperation Treaty Application No. PCT/EP2017/054535, filed on Feb. 27, 2017, which is a continuation of Patent Cooperation Treaty Application No. PCT/EP2016/000344, filed on Feb. 27, 2016 and a continuation of PCT/EP2016/000345, filed on Feb. 27, 2016.

TECHNICAL FIELD

The invention relates to a method of memory addressing as well as a corresponding data-processing apparatus, computer program, data carrier, and data structure.

BACKGROUND ART

In the context of security technology and information governance, by information security is meant the practice of preventing unauthorized access, use, disclosure, disruption, modification, inspection, recording or destruction of information. Information security of data-processing apparatuses is termed cybersecurity, computer security, or IT security. State-of-the-art cybersecurity encompasses control of physical or network access to data-processing apparatuses as well as protection from disruption or misdirection of the services they provide, data manipulation, and code injection.

As an example of the latter class of attacks, FIG. 1 illustrates the possible exploitation of a software defect in an insecure prior-art data-processing apparatus (10) graphically represented by its technology stack. As per the traditional von Neumann architecture for electronic digital computers, the prior-art apparatus (10) takes the form of a stored-program computer, that is, a computer based on a central processing unit (11) whose program instructions, as well as data, are kept in one single, uniform, read-write, random-access memory (RAM) devoid of specific security precautions.

This property is reflected in the processor's instruction set architecture (ISA), which is predominantly embodied in its instruction decoder (12). While FIG. 1 depicts the instruction decoder (12) as a separate functional block atop the central processing unit (11), the former is in fact integrated within the latter rather than implemented as discrete circuitry. Interfacing to said hardware (11, 12) is the low-level software (13) constituted by drivers and further elements—such as a basic input-output system (BIOS) in case of a personal computer (PC)—as well as profound layers of the operating system (OS) which, among other tasks, configures the hardware's memory management unit (MMU) and provides task management and process scheduling capabilities.

Said hardware and basic OS functionality (11, 12, 13) constitute the foundation for any software adapted to the data-processing apparatus (10), such software typically comprising multiple layers (14) of middleware that culminate in the actual application (15). Where the software is faulty in any of said layers, an attacker—in what is known as a cyber-attack (17)—may leverage this vulnerability and cause the data-processing apparatus (10) to crash. Even more severely, to seize control of the apparatus (10), an exploit of the vulnerability could enable the attacker to maliciously bypass (18) all lower software layers of the technology stack in order to directly access the instruction decoder (12), thereby usurping unrestricted power over all resources offered by the insecure "bare-metal" hardware system (11, 12). To this end, once having breached the designated flow of control, the attacker may redirect it to machine instructions of his choosing that have been injected into or selected from memory by a technique referred to as return-oriented programming (ROP). Once such "malware" is fed to the instruction decoder (12), the data-processing apparatus (10) may exhibit unintended or unanticipated behavior, and may even become completely controlled by the attacker.

Conventional approaches to detecting or preventing code injections include marking of memory areas to the apparatus as non-executable. Another countermeasure particularly suited for buffer overflow attacks is known in the art as "stack canaries". Return address overwrites such as seen during exploitation of stack buffer overflows may further be mitigated by so-called shadow stacks. These and other techniques are employed by the artisan to maintain control-flow integrity (CFI), that is, prevent malware attacks from redirecting or hi-jacking the flow of execution of a program.

SUMMARY OF INVENTION

The invention as claimed is hereinafter disclosed in such a way that the technical problem with which it deals can be appreciated and the solution can be understood.

Technical Problem

The problem to be solved is to seek an alternative to known concepts which provides the same or similar effects or is more secure.

Solution to Problem

To elucidate the nature of the solution, reference is made to the characterizing portion of the independent claims.

Advantageous Effect of Invention

The invention gives rise to efficient data processing, efficient data storage, and enhanced security.

BRIEF DESCRIPTION OF DRAWINGS

FIG. 3 shows a data structure used in the apparatus.

FIG. 4 shows a method of addressing memory in the apparatus.

FIG. 5 shows pointer and descriptor words used in the method.

DESCRIPTION OF EMBODIMENTS

Figure 1:
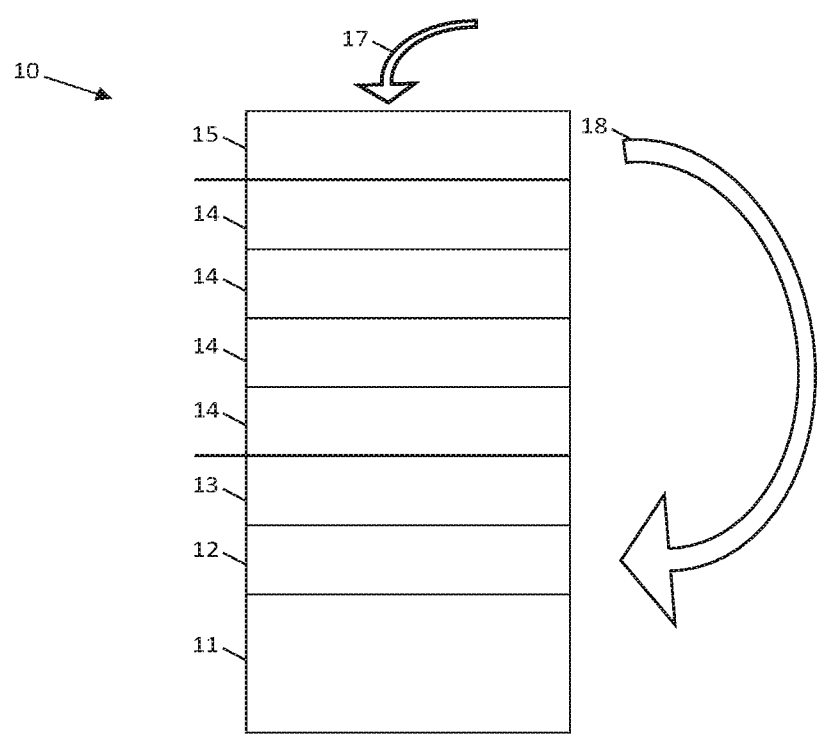
FIG. 1 shows a data-processing apparatus in accordance with the prior art.
Figure 2:
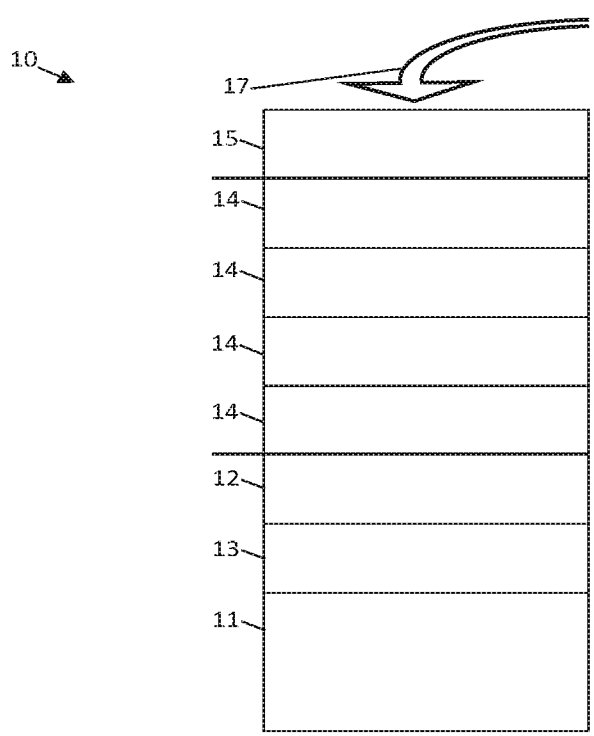
FIG. 2 shows a data-processing apparatus as per the invention.

Referring to FIG. 2, the invention mitigates the impact of a cyber-attack (17) by introduction of what may be considered a cybersecure ISA. By virtually swapping, in terms of their levels within the technology stack, the instruction decoder (12) for the task, process, and memory management layer, this layer (13) and the instruction decoder (12) are arranged such that the latter isolates the former from direct access by potentially malicious software, all while leaving the higher parts of the technology stack intact. In a preferred embodiment, recognizing the indispensability of task separation for the design of a fully secure apparatus (10), the scheduler is even at least partly implemented in hardware and said part—being in charge of all process switching activities of the scheduler—directly wired to the memory management unit (MMU).

Where the data-processing apparatus (10) takes the form of a concurrent system, this approach allows for a virtual memory layout (30) as exemplified in FIG. 3. The structure (30) shown is laid out in a two-dimensional grid comprising at least one row and at least one column of mutually disjunct virtual memory spaces "mem s1", "mem s2", and so forth, each of which not only being uniquely associated with one among the tasks (31, 32, 33, 34)—as is state-of-the-art in contemporary virtual memory management designs—but additionally also being uniquely associated with one of the memory segments (s, r, d, h, f, o, i, c). Therefore, each single memory cell of the overall memory structure (30) is uniquely identified by its row number (segment), its column number (task), and its local virtual address (45) within the selected virtual memory subspace, any unique combination of said three identifiers constituting a composite augmented virtual address or hyperaddress, for short. In an alternative embodiment that extends upon this concept, any column associated with a multi-threaded task would split into multiple columns, each being associated with an execution thread of the respective task (31, 32, 33, 34) and effectively rendering the grid three-dimensional. When hereinafter reference is made to a task (31, 32, 33, 34), such a task may be understood to comprise any number of threads, the generalizations necessary for multi-threaded task processing being regarded as obvious and part of the scope of the invention.

Vertically, the grid of the present example comprises eight rows, each row being uniquely associated with a memory segment. For any among the tasks (31, 32, 33, 34), one such segment remains hidden to and inaccessible for the software itself, and contains a stack exclusively dedicated to subroutine return addresses and controlled by hardware. Especially in a stack machine, that task (31, 32, 33, 34) may also entail a segment (r) containing a working stack that stores subroutine contexts, call, return, and local variables, and intermediate computational results. A segment (d) containing an ancillary data stack is optional. Finally, the task (31, 32, 33, 34) could possess any number of heap (h), file (f), write-only channel output (o), or read-only channel input (i) segments as needed.

A mandatory code (c) segment, hidden and inaccessible by the software itself, serves as read-only input to the instruction decoder (12), otherwise being protected from reading and writing. This feature may be considered an implementation of the Harvard computer architecture as it imposes distinct code and data address spaces, rendering the memory layout (30) invulnerable to code injection.

Attention is now directed to FIG. 4, which highlights the address resolution per the proposed ISA. When the central processing unit (11), while performing one of the tasks (31, 32, 33, 34), executes an instruction involving a pointer into one of the memory segments (s, r, d, h, f, o, i, c), it decodes the instruction by means of the instruction decoder (12), as would in and of itself be expected in a conventional system. Characteristically of this embodiment however, the instruction decoder (12) now generates a local virtual address (45) by means of a safe pointer operator (41) that is preferably implemented in hardware. The ISA defines a pointer instruction subset specifically dedicated to this purpose.

Once generated, the local virtual address (45) is augmented, such as through concatenation, by an identifier (43) of the task (31, 32, 33, 34) and an identifier (44) of the memory segment (s, r, d, h, f, o, i, c), both identifiers being essentially hardware-controlled (42), identifier (43) by the scheduler, and identifier (44) by the safe pointer operator (41). Based on this composite augmented virtual address—hyperaddress—(46), the pointer may finally be dereferenced via the memory management unit (MMU) and its data accessed safely and securely. By design, each task (31, 32, 33, 34) thus benefits from its own data privacy sphere as well as full memory access integrity and control flow integrity and hence resides in what in the art is known as a "trust zone" that is maintained by a per-task virtual processing scheme (as opposed to known coarser—and more vulnerable—two-virtual-processor schemes).

In a preferred embodiment explained regarding FIG. 5, the apparatus (10) takes the form of a stack machine, wherein pointers are always kept on a protected working stack in memory segment (r) and never in unprotected memory or file (d, h, f, o, i). As more fully exemplified in FIG. 7, information (56) of FIG. 5 comprises a part or segment (e.g., 12 bits wide) of a typed data word (50) or (58) which contains binary data type information (51) and a remaining part or segment (57) that holds the binary raw data content of the typed data word (50). In this scenario, the central processing unit (11), when executing the instruction, extracts the pointer's (59) target information (52, 53, 54) from the typed data word (50) on the working stack in memory segment (r). The typed data word (50) comprises information (51) regarding the pointer's (59) own data type—to be evaluated by the safe pointer operator (41)—and protection status—to be checked by the instruction decoder (12)—and further information necessary for the low-level operating system layer (LLOS) (13) e. g. to safeguard memory accesses from hazards like "dangling pointers" or to organize inter-task channel communications. The pointer's (59) target data field comprises a target data type word (52) indicating the type of the data it references (either data by value or a further pointer) as well as a handle (53) referring to a block of virtual memory allocated and assigned to the pointer (59) within its target segment (s, r, d, h, f, o, i, c) and an index (54) referring, within said virtual memory block, to the final virtual memory location of that data record which holds the binary data word referenced by the pointer (59). Of these components, only the index (54) information can be loaded into or retrieved from the pointer (59) by software. This capability proves useful for structures that contain pointer values, as may be used in C or similar programming languages.

Figures 6, 7:
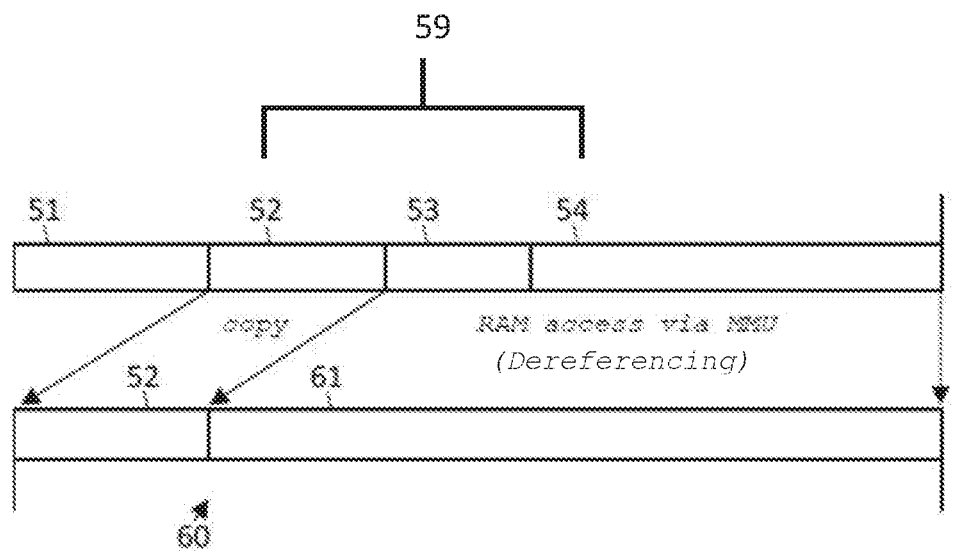
FIG. 6 shows a data word used in the method.
FIG. 7 shows a type word used in the method.

The eminent benefit of the type word (52) is best gathered from FIG. 6 where that word is employed to assemble what could be called a typed data word (60): Upon dereferencing the pointer (59) by loading the "raw", that is type-less, data word (61)—via the memory management unit—from RAM or any other memory location onto the stack, the result is complemented with the type word (52), which can simply be copied from the pointer (59) that referenced it. The binary data loaded to the stack is now complete with information on how to handle and interpret it. Hence, metaphorically speaking, the pointer (59) "knows" the data type it references.

Since type information is henceforth contained in a segment (r) containing data space as opposed to a segment (c) containing code space, CPU execution may be guided by type, reducing the required instruction set to a minimum. The resulting ability to use universal standard code for all—even vector or otherwise special—data types confers extreme flexibility to the data processing apparatus (10). In programming languages and type theory, such provision of a single interface to entities of different types is known as polymorphism.

FIG. 7 demonstrates how even a compact 12-bit type word (52) may convey an abundance of type information. For instance, in the draft depicted, bits 10 and 11 of the type word (52) indicate whether the ensuing data word (61) contains binary data by value or a pointer (59) to either data or some other pointer. This type information is respected by all instructions of the data processing apparatus (10) which in a preferred embodiment are designed to either target data words ("data instructions") or pointer words ("pointer instructions") and which, when applied to the "wrong" type of word, raise an exception. By this device, numerical data held on the working stack contained in memory segment (r) is protected from being mistaken as a pointer and pointers are protected from being overwritten or tampered with by operations not specifically designed for this purpose within the instruction set architecture (ISA), the operating system task (OS) being an exception of this generic safety-of-operation rule. Where that pointer (59) represents a range of addresses within memory rather than a fixed address, bits 10 and 11 would also designate whether the pointer (59) have read/write or read only or write only permissions, the latter two options offering hardware support for e. g. ring buffers for inter-task channel communication via hardware-coupled—and hence functionally safe—write and read pointer pairs. A subsequent descriptor word (58) on the stack may arithmetically describe the address range itself in terms of certain structural properties—e. g., linear as in an array or cyclic as in a ring buffer—, specify an incremental stride to be used when advancing the pointer (59) throughout the range, the size of the range, or its base address (55). Herein, stride and size should preferably be expressed as multiples of the width of the respective data, that is, the size of the record holding them. Note that these parameters, when considered in their entirety, implicitly define the boundaries of the represented address range. Based on this knowledge, the hardware may practically guarantee functional safety of all pointer accesses including protection from unauthorized reading or overwriting. In the context of abstract data types, the outlined concept would commonly be referred to as a smart pointer.

In the draft at hand, bit 9 of the type word (52) marks the—contained or referencing—data as being either of an elementary or composite, further structured type. In the former case, the type word (52) may also provide guidance on aspects like the following:

the width of the data expressed in a unit of raw information such as bits (bits 6, 7, 8),
whether the data constitutes a vector unit or sub-unit of multiple data points (bit 5) preferably to be processed with a parallel single SIMD instruction of the central processing unit (11),
whether the data type is standard or a—preferably nullable—interval type (bit 4),
whether the data is a floating-point or an unsigned or signed integer number or otherwise special—such as a character, index of a pointer, function pointer, semaphore or inter-task communication channel—(bits 2, 3),
whether the data has been loaded from a buffer or cache memory into the stack—and hence is valid—or such load is pending ("lazy" loading bit 1), and
whether the data has been newly added to or changed on the stack since last loaded from buffer or cache memory—and hence is out-of-sync with said buffer or cache memory ("dirty" bit 0).

INDUSTRIAL APPLICABILITY

The invention may be applied, inter alia, throughout the semiconductor industry.

The invention claimed is:

1. A method (40) of addressing memory in a data-processing apparatus (10) comprising a central processing unit (11), the central processing unit performing a task (31, 32, 33, 34) of the apparatus (10), the task (31, 32, 33, 34) of the apparatus comprising executing an instruction involving a virtual memory address (45) located in a segment (s, r, d, h, f, o, i, c) of the memory, the method comprising:
   decoding the instruction by means of an instruction decoder (12),
   augmenting the virtual memory address (45) by an identifier (43) of the task (31, 32, 33, 34) or an identifier (44) of the segment (s, r, d, h, f, o, i, c), or both identifiers (43, 44), said identifier or identifiers being hardware-controlled (42),
   translating the augmented address (46) by a memory management unit (MMU) to a corresponding physical address, wherein the virtual memory address is generated by executing an instruction involving a pointer (59) to a segment (s, r, d, h, f, o, i, c) of the memory.

2. The method (40) of claim 1, further comprising:
   dereferencing the pointer (59) for a data load by assembling a typed data word (60), wherein the typed data word (60) comprises a data word (61) and a type word (52), the data word (61) comprising loaded binary raw data, wherein the type word (52) is part of and copied from the pointer (59) and indicates an abstract data type (ADT) associated to the loaded binary raw data, thereby declaring the ADT of the assembled typed data word (60); and
   processing the typed data word (60) based on the type word (52).

3. The method (40) of claim 2 wherein the data word (61) is referenced by means of a handle (53) referring to a memory block allocated to the pointer (59) within one of the segments (s, r, d, h, f, o, i, c) or within unsegmented memory and an index (54) referring, within the memory block, to a data record holding the data word (61).

4. The method (40) of claim 2, wherein the type word (52) of the typed data word (60) indicates whether the data word (61) contains data by value, a pointer (59), or a descriptor belonging to a pointer, and the type word (52) further indicates whether the data word (61) is of an elementary type or a composite type, and the pointer (59) references either data by value or a further pointer.

5. The method (40) of claim 4, wherein the type word (52) indicates that the type is an elementary data word and also indicates any or all of the following:
   a width of the data expressed in a unit of information,
   whether the data constitutes a vector of multiple data points preferably to be processed with a single instruction of the central processing unit (11),
   whether the data is of a standard or an interval type,
   whether the data is of a numeric type, or is a character, a string, user-defined, or otherwise special, whether the data has been loaded from a buffer or cache memory or such a load is pending, whether the data has been added to or changed since last its last load from buffer or cache memory.

6. The method (40) of claim 4, wherein if the type word (52) indicates that the data word (61) contains a pointer (59) and specifies which of the segments (s, r, d, h, f, o, I, c) the pointer points to, and the pointer (59) is a smart pointer.

7. The method (40) of claim 4 wherein, the type word (52) further indicates that the type is a descriptor belonging to a pointer, and the data word (61) contains a descriptor (55) which describes any or all of the following:

an arithmetic type of the pointer (59) selected from linear ("array pointer"), cyclic ("ring buffer pointer"), and arithmeticless ("fixed pointer"), a stride, expressed as a multiple of the width of the data to which the pointer points to, expressed as a unit of information, a base address and a size of a range allowed for access by the pointer (59).

8. The method of claim 2, wherein the step of generating the virtual memory address (45) within the memory of said task is performed by means of a safe pointer operator (41) operating on the pointer (59).

9. The method of claim 2, wherein the pointer (59) is located in protected memory.

10. The method of claim 9, wherein the protected memory comprises a working stack, and the pointer (59) is contained in the working stack.

11. A data-processing apparatus (10) having memory, a central processing unit (11), an instruction decoder (12), a low-level operating system (LLOS) layer comprising at least task, process, and memory management facilities and implemented in LLOS layer software, in hardware, or in a combination of both (13), wherein the data processing apparatus is adapted to execute the steps of the method (40) of claim 1.

12. The data-processing apparatus (10) of claim 11, wherein the instruction decoder (12) and the LLOS layer (13) are arranged such that the instruction decoder (12) isolates the LLOS layer (13) from any unintended use by malicious or faulty software.

13. The data-processing apparatus (10) of claim 12, wherein the LLOS layer software comprises:

multiple layers (14); and an application (15) based upon the layers (14).

14. A non-transitory computer readable medium having instructions stored thereon, wherein when executed by a processor, the instructions execute the steps of the method (40) of claim 1.

15. A data-processing apparatus (10) having memory, and a central processing unit (11), wherein the data processing apparatus (10) is configured to perform the method (40) of claim 1 thereby implementing a virtual memory layout and structure (30) and providing the augmented virtual address (46) to the memory management unit (MMU) of the data processing apparatus (10), the structure (30) having an at least two-dimensional grid layout of columns and rows of virtual memory address spaces.

16. The data processing apparatus (10) of claim 15 wherein, in the virtual memory layout and structure (30), for each task (31, 32, 33, 34) among the tasks (31, 32, 33, 34), the column associated with that task (31, 32, 33, 34) comprises multiple levels, each being associated with an execution thread of the respective task (31, 32, 33, 34) and accordingly, the task identifier prefix (43) of the augmented virtual address (46) constructed by the method (40) comprises additional information regarding the identifier of the executing thread.

* * * * *